UNITED STATES PATENT OFFICE.

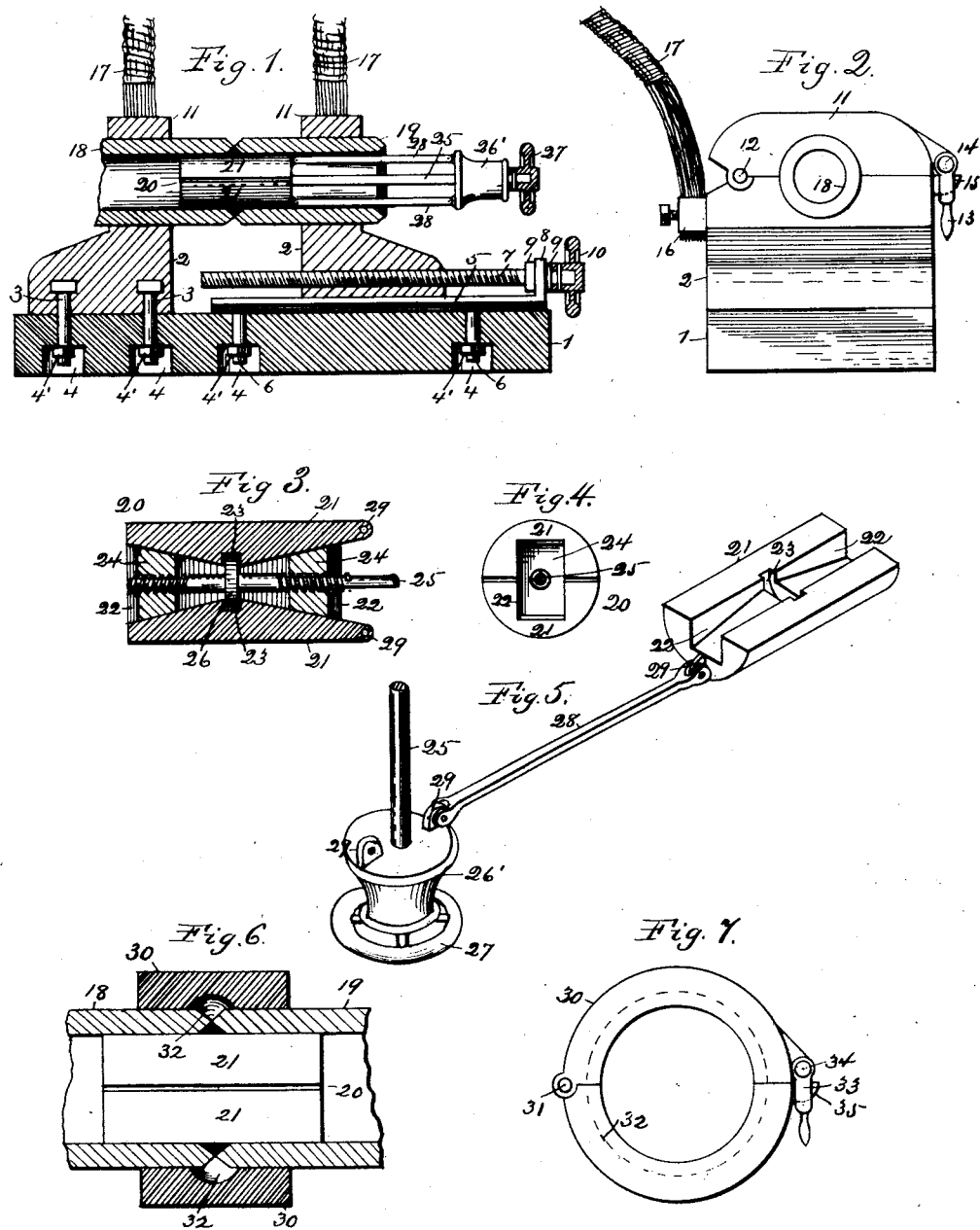

ELIAS E. RIES, OF BALTIMORE, MARYLAND, ASSIGNOR TO RIES & HENDERSON.

PROCESS OF WELDING TOGETHER SECTIONS OF PIPE BY ELECTRICITY.

SPECIFICATION forming part of Letters Patent No. 402,107, dated April 23, 1889.

Application filed February 12, 1889. Serial No. 299,572. (No model.)

*To all whom it may concern:*

Be it known that I, ELIAS E. RIES, a citizen of the United States, residing at Baltimore, in the State of Maryland, have invented certain new and useful Improvements in Processes of Welding together Sections of Pipe, of which the following is a specification.

This invention has reference to the art of welding sections of pipes or other hollow articles together electrically, and its object is to prevent the formation of a rib or burr on the interior surface of the welded sections, so that such interior surface may remain smooth and unobstructed.

When pipe-sections or other hollow articles are welded together by the process heretofore used, the plastic metal is upset at the point of juncture, and to a considerable extent forced into the interior of the welded sections, there forming a rib or burr which contracts the internal area of the pipe and obstructs the passage. This invasion of the pipe I prevent by placing within the sections at the point to be welded a removable core of any suitable substance or form, which, bearing on the interior surface of the pipe-sections, will effectually resist the invasion of the plastic metal, and, as the latter is upset, will thereby cause the excess of metal to accumulate on the exterior of the sections at the joint, forming a bead or rib that is not only unobjectionable, but imparts additional strength to the said joint.

In practicing my process I first place the sections with the ends to be welded together in contact, and then insert the core through one end of one of the sections and manipulate it to bear on the inner surface of the sections at the contiguous ends, and then cause the upsetting of the said ends to produce the weld, as will hereinafter more fully appear.

For practicing my process a great variety of apparatus may be employed, and I have shown in the annexed drawings, which form part of this specification, an apparatus which may be used to advantage, but to which it is to be understood I am in no manner confined, and to which no claim is herein made, nor to any part thereof.

I have illustrated in Figure 1 an apparatus for the practical application of my process, in which two pipe-sections are shown in position to be welded together, the apparatus being shown mainly in longitudinal section; in Fig. 2, an end view of the apparatus shown in Fig. 1; in Fig. 3, a longitudinal section, on a larger scale than that of Fig. 1, of an expansible and removable core which may be used in my process; in Fig. 4, an end view of the core shown in Fig. 3; in Fig. 5, a perspective view of one section of the core, the link connected therewith, the head to which the link is secured, and a portion of the core-manipulating rod and its hand-wheel; in Fig. 6, a view, mainly in longitudinal section and on the same scale as Fig. 3, of the contiguous ends of two pipes to be welded with the core in position, and an exterior mold-clamp for forming an external head or rib at the joint; and in Fig. 7, a side view of the mold-clamp.

Like numerals of reference indicate like parts throughout the drawings.

Upon a bed-plate, 1, constructed of wood or other insulating material, are mounted two castings, 2 2. One of these castings is secured directly and immovably to the bed by bolts 3, having their heads embedded in the casting and their threaded ends extending through the bed-plate into countersinks 4 on its upper side, and they there have nuts 4' applied to them. The other casting is movable on the bed to and from the fixed casting, and is held to the said bed by a beveled plate or bar, 5, which passes through an undercut groove in the under side of the casting, as shown. This plate or bar 5 is secured to the bed by bolts 6, extending therethrough and into other countersinks, 4, where nuts 4' are applied to them. The movable casting is adjusted on the plate 5 to and from the other or fixed casting by means of a screw-rod, 7, which extends through a nut in the movable casting, and also through the upturned end 8 of the plate or bar 5. This rod is provided on each side of the upturned end 8 with a collar, 9, and terminates in an insulating hand-wheel, 10, of wood or other suitable material. It will now be apparent that on turning the hand-wheel 10 in one direction or the other the movable casting may be adjusted to or from the fixed casting.

On the upper part of each casting is a jaw, 11, connected near one end to the said casting by a hinge, 12, and at the other end provided with a latch, 13, hinged thereto at 14. When the jaw is closed on the top of the casting, it is held thereto by engaging the latch 13 over a nose, 15, on the said casting. The casting and the jaw hinged thereto form, in effect, a clamp, both parts being recessed to receive the section of pipe or other article to be welded. These recesses may be semicircular in shape to receive and hold cylindrical pipe-sections such as shown in the drawings, or they may be of any other shape to conform to that of the sections to be welded, or I may use bushings of various sizes and shapes to adapt the clamps to the articles to be welded. Each casting is provided with a binding-post, 16, and these binding-posts receive the leading-in wires 17, coming from a source of electrical current capable of heating the articles held by the clamps to a welding heat.

By preference I use in my process alternating currents of low tension and great quantity—such, for instance, as are furnished by inductional transformers; but I may with advantage use other means of producing low-tension currents, such as the direct current of a dynamo or a secondary battery.

In the drawings I have shown two sections of straight pipe, 18 19, clamped in position for welding; but my process is not confined to the welding together of straight sections, as it may be used for curved or other shaped sections, the shape of the clamps being modified to hold the same. Within the pipe-sections at the joint to be welded I place a removable core, 20, of refractory insulating material—such as clay, slate, sand, or other substance; but I prefer to construct the same of two solid approximately semi-cylindrical pieces, 21 21, each being somewhat less than a half-cylinder, so that when placed together they may be readily inserted in the pipe-sections and be subsequently separated to bear on the interior surface thereof. Each piece 21 has in its flat side a longitudinal groove or recess, 22, decreasing in depth from the ends toward the center, and there terminating in a laterally-arranged curved recess, 23, of greater diameter than the groove 22. When the two sections of the core are placed together, these grooves form wedge-shaped passages and the two recesses 23 form a central annular groove. Within these passages I place wedge-shaped nuts 24, with a right and left hand screw-rod, 25, passing through them, and provided with a collar, 26, occupying the annular recesses 23. The rod 25 is of sufficient length to extend beyond the free end of one of the pipe-sections when the core is at the joint, and at the outer end it extends through a block or head, 26', and is there provided with a hand-wheel, 27, of wood or other insulating material.

Each section 21 of the core is connected to the block 26 by a link, 28, pivoted to eyes 29 on both the core and block. It will now be seen that by manipulating the hand-wheel 27 to turn the rod 25 in either direction the wedge-nuts 24 will be drawn toward each other or forced apart, and the core expanded or contracted.

With an apparatus constructed as above described my process is practiced as follows: I first place the two sections of pipe or other hollow articles to be welded together in the clamps, with the edges of the pipes facing each other. Then by operating the screw-rod 7 these edges are brought into contact. I then insert the core in the closed or contracted condition through the open end of one of the pipes and move it forward to bridge the interior of the ends to be welded. Then I turn the rod 25 to cause the wedges to approach each other, and thereby force the two parts of the core apart. The core thus expanded fills the interior of the pipe-sections and bears on the internal surface of the ends to be welded. The electric current is now allowed to pass, and in its passage meets its greatest resistance at the ends of the sections, which are, by preference, chamfered both inside and outside down to a comparatively thin edge, as shown. These edges are almost immediately brought to a welding heat and form an initial weld, while the thicker portions of the chamfer and the adjacent parts are more slowly reduced to the plastic state, after which I complete the weld by manipulating the screw-rod 7 to force the sections together and upset the metal at the joint. The core presents an unyielding surface on the interior of the pipe and effectually resists the tendency of the plastic metal to invade the pipe-sections and form a rib or burr, which would reduce their internal area or capacity. The upset metal therefore accumulates in the form of a bead or rib on the exterior of the joined sections, which is not only unobjectionable, but advantageous. I form this rib by the use of a mold-clamp, 30, of refractory and insulating material—such as clay, slate, or other suitable substance—and constructed of two semicircular jaws hinged together at 31, and each provided on the inner face with a groove, 32. (Shown in section in Fig. 6 and indicated by dotted lines in Fig. 7.) This clamp is applied to the ends to be welded, and the jaws are held together by a latch, 33, hinged to one jaw at 34 and engaged over a nose, 35, on the other jaw. As the plastic material accumulates on the exterior of the sections, it flows into and finally fills the groove 32, thereby forming a well-defined bead on the exterior of the pipe, which materially strengthens the joint, while the interior is smooth and unobstructed. In place of a regular mold-clamp I may use a loose wrapping of asbestos cloth, in which case, however, the external rib or projection will not be so well defined. The expansion of the core will cause a slight separation of the two parts thereof, and in practice a small amount of the plastic metal may flow therein. This interior projection at the joint, if present, will offer no appreciable obstruction to the passage, as it will be very thin and longitudinally disposed in the welded pipes, and, if necessary, can be readily removed. The formation of such an interior projection may be prevented, however, by the use of a core of sand or other substance in a finely-divided state that can be packed solidly in the sections when in contact and easily removed when the weld is completed.

When the mold-clamp for circumscribing and shaping the bead on the outside of the pipe is used in practicing my invention, the metal forming such bead or protuberance will be as dense as that of the body of the pipe, having been compressed within the mold to a considerable degree; but the protuberance may be further condensed by compression or, preferably, by hammering, and by this additional step in my process great strength is given to the weld and is of particular utility when, in the place of a regular mold-clamp, a loose wrapping of asbestus cloth is used, or when neither the mold-clamp nor asbestus cloth is used, for in that case the upset material forming a protuberance on the outside of the pipe will be comparatively porous unless it be condensed by hammering or otherwise.

By my process a long line of tubes or pipes may be produced by welding together successive sections of the same, in which case the expansible core is moved from section to section—that is to say, after the production of the weld between two sections the core is removed and is placed in position at the next succeeding joint, and so forth, to the end of the line of pipes.

Having described my invention, what I claim, and desire to secure by Letters Patent, is—

1. The process of welding together sections of metal pipe or other hollow metallic articles, consisting in backing the interior of the sections about the contiguous ends by means of an unyielding core, and then raising the said ends to a welding heat by means of a current of electricity and upsetting the plastic metal to complete the weld, substantially as described.

2. The process of welding together sections of metal pipe or other hollow metallic articles, consisting in introducing a core within the sections, then raising their contiguous ends to a welding heat by the action of a current of electricity, and then forcing the sections together to complete the weld, substantially as described.

3. The process of welding together sections of metal pipe or other hollow metallic articles, consisting in raising the contiguous ends of the sections to a welding heat by the action of a current of electricity and then upsetting the said ends in the presence of an unyielding internal medium, whereby the upset metal is forced to the exterior of the pipe, substantially as described.

4. The process of welding together sections of metal pipe or other hollow metallic articles, consisting in raising their contiguous ends to a welding heat by the action of a current of electricity and in the presence of an unyielding core, and then upsetting the said ends and circumscribing and limiting the protuberance of the metal on the exterior of the sections, substantially as described.

5. The process of welding together sections of metal pipe or other hollow metallic articles, consisting in reducing the mass or thickness of the edges to be welded to increase their electrical resistance, then placing the sections with the reduced edges in contact, then introducing a removable core of electrically non-conducting material within the sections, and then raising the ends of the sections to a welding heat by a current of electricity and forcing the said ends together to upset the fused metal and complete the weld, substantially as described.

6. The process of welding together sections of metal pipe or other hollow metallic articles, consisting in reducing the mass or thickness of the edges to be welded to increase their electrical resistance, then placing the sections with the reduced ends in contact, then introducing a removable core of electrically non-conducting material within the sections, then raising their contiguous ends to a welding heat by the action of a current of electricity, and upsetting the plastic metal and circumscribing and limiting the protuberance thereof on the exterior of the sections, substantially as described.

7. The process of welding together sections of metal pipe or other hollow metallic articles, consisting in raising their contiguous ends to a welding heat by the action of a current of electricity in the presence of an unyielding core, then upsetting the said ends, whereby the upset metal is forced to the exterior of the pipe, and then condensing the upset portion by external pressure or hammering, substantially as described.

8. The process of forming continuous lines of pipe, consisting in electrically welding together one section after the other of such pipe in the presence of an unyielding removable core at the lines of juncture, whereby the upset metal is forced to the exterior of the pipe, substantially as described.

In testimony whereof I have signed my name to this specification in the presence of two subscribing witnesses.

ELIAS E. RIES.

Witnesses:
E. H. PILSBURY,
L. A. WRAY.